US011256493B1

(12) United States Patent
Venkataraman Palani et al.

(10) Patent No.: US 11,256,493 B1
(45) Date of Patent: Feb. 22, 2022

(54) CONTAINER IMAGE OPTIMIZER (71) Applicant: BANK OF AMERICA CORPORATION, Charlotte, NC (US)

(72) Inventors: Karthik Rajan Venkataraman Palani, Chennai (IN); Madhusudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/088,209

(22) Filed: Nov. 3, 2020

(51) Int. Cl.
| | |
|---|---|
| *G06F 8/61* | (2018.01) |
| *G06F 8/71* | (2018.01) |
| *G06F 11/30* | (2006.01) |
| *G06F 11/34* | (2006.01) |

(52) U.S. Cl.
CPC .................. *G06F 8/63* (2013.01); *G06F 8/71* (2013.01); *G06F 11/3034* (2013.01); *G06F 11/3089* (2013.01); *G06F 11/3442* (2013.01)

(58) Field of Classification Search
None
See application file for complete search history.

(56) References Cited

U.S. PATENT DOCUMENTS

| | | | |
|---|---|---|---|
| 8,341,648 B1 | 12/2012 | Cook | |
| 8,438,495 B1 | 5/2013 | Gilra et al. | |
| 8,621,069 B1 | 12/2013 | Tompkins | |
| 8,713,566 B2 | 4/2014 | Kashyap et al. | |
| 8,966,464 B1* | 2/2015 | Christopher | G06F 9/44563 717/166 |
| 9,122,562 B1 | 9/2015 | Stickle | |
| 9,256,467 B1 | 2/2016 | Singh et al. | |
| 9,367,305 B1 | 6/2016 | Kumar et al. | |
| 9,626,166 B1* | 4/2017 | Alewine | G06F 21/53 |
| 9,830,449 B1 | 11/2017 | Wagner | |
| 9,916,233 B1 | 3/2018 | Qureshi et al. | |
| 9,965,261 B2 | 5/2018 | Chen et al. | |
| 10,002,247 B2 | 6/2018 | Suarez et al. | |
| 10,013,291 B1 | 7/2018 | Nielsen et al. | |
| 10,032,032 B2 | 7/2018 | Suarez et al. | |
| 10,104,185 B1* | 10/2018 | Sharifi Mehr | H04L 41/0896 |
| 10,152,595 B2 | 12/2018 | Wiest et al. | |

(Continued)

FOREIGN PATENT DOCUMENTS

| | | |
|---|---|---|
| CN | 108885568 A | 11/2018 |
| JP | 6261758 B2 | 1/2018 |
| WO | 2014047073 A1 | 3/2014 |

*Primary Examiner* — Qing Chen (57) ABSTRACT

A system accesses a disk image of a first software container and collected sensor data for a computer server. The system sequentially analyzes the sequence of layers of the disk image, and generates, based on the sequential analysis of the sequence of layers of the disk image, an auto coding sequence. The auto coding sequence includes a sequence of instructions for creating a new disk image. The system determines, based on the collected sensor data and the sequential analysis of the sequence of layers of the disk image, a sequential list of software needed for the computer server. The system determines, using the sequential list of software needed for the computer server, a plurality of infra requirements for a new software container. The system generates the new software container and the new disk image using the auto coding sequence and the plurality of infra requirements.

20 Claims, 3 Drawing Sheets

(56) References Cited

U.S. PATENT DOCUMENTS

| | | |
|---|---|---|
| 10,162,672 B2 | 12/2018 | Wagner et al. |
| 10,261,782 B2 | 4/2019 | Suarez et al. |
| 10,318,882 B2 | 6/2019 | Brueckner et al. |
| 10,503,623 B2 | 12/2019 | Keller |
| 10,586,042 B2 | 3/2020 | Stopel et al. |
| 10,592,269 B2 | 3/2020 | Wagner et al. |
| 2006/0136928 A1 | 6/2006 | Crawford, Jr. et al. |
| 2006/0168575 A1 | 7/2006 | Bhatt et al. |
| 2006/0168581 A1 | 7/2006 | Goger et al. |
| 2008/0144471 A1* | 6/2008 | Garapati ............... G06F 8/63 369/99 |
| 2009/0125546 A1 | 5/2009 | Iborra et al. |
| 2010/0153941 A1 | 6/2010 | Borissov et al. |
| 2013/0191527 A1 | 7/2013 | Ashok et al. |
| 2013/0311613 A1 | 11/2013 | Aleksandrov et al. |
| 2014/0149986 A1 | 5/2014 | S. M. et al. |
| 2015/0302220 A1 | 10/2015 | Cismas et al. |
| 2016/0164762 A1 | 6/2016 | Reque et al. |
| 2016/0205518 A1 | 7/2016 | Patel et al. |
| 2016/0239799 A1 | 8/2016 | Burch et al. |
| 2016/0335454 A1 | 11/2016 | Choe et al. |
| 2016/0366104 A1 | 12/2016 | Goldberg et al. |
| 2016/0378517 A1 | 12/2016 | Zellermayer et al. |
| 2017/0063722 A1 | 3/2017 | Cropper et al. |
| 2017/0264684 A1 | 9/2017 | Spillane et al. |
| 2018/0205708 A1* | 7/2018 | Kurian ............... G06F 21/121 |
| 2019/0250946 A1* | 8/2019 | Parameshwaran ...... G06F 9/455 |
| 2019/0377510 A1 | 12/2019 | Walsh et al. |
| 2020/0003416 A1 | 1/2020 | Holland et al. |
| 2021/0049002 A1* | 2/2021 | Myers ............... G06F 8/71 |
| 2021/0097037 A1* | 4/2021 | Babol ............... G06F 21/53 |

\* cited by examiner

CONTAINER IMAGE OPTIMIZER

TECHNICAL FIELD

The present disclosure relates generally to disk images and containers, and more specifically to a container image optimizer.

BACKGROUND

In computer science, a disk image is a replica of the contents of a storage device (e.g., a hard disk drive) stored on a second storage device. In addition, a software container is a standard unit of software that packages up code and dependencies for the code so that an application runs efficiently and reliably from one computing environment to another. Typically, parameters needed for building an image into a container are manually coded by a user.

SUMMARY

In computer science, a disk image is a replica of the contents of a storage device (e.g., a hard disk drive) stored on a second storage device. In addition, a software container is a standard unit of software that packages up code and dependencies for the code so that an application runs efficiently and reliably from one computing environment to another. Typically, parameters needed for building an image into a container are manually coded by a user. This may lead to inefficiencies and wasted computer resources. For example, a user may allocate more memory for a container than is actually needed by the container, thereby tying up memory for the computer server that cannot be used for other applications. As another example, a user may allocate too little memory for a container, thereby causing a computer server to run out of memory for the container. As yet another example, a user may make errors in identifying dependencies (e.g., libraries, third-party tools, etc.) needed for upload of a disk image, thereby causing errors in the image.

This disclosure contemplates a container image optimizer that automatically generates parameters needed for building a disk image into a container. Generally, the container image optimizer acts as a digital twin of an existing container where a generic data-driven machine-learning model for the time evolution of the system parameters of a container are analyzed. The container image optimizer acts as a simulator of the container which enables auto coding for accurate and efficient image creation. The container image optimizer is enabled by virtualizing a container through systematic consolidation of data, event logs, and other parameters described below.

In some embodiments, a system accesses a disk image of a first software container and collected sensor data for a computer server. The system sequentially analyzes the sequence of layers of the disk image, and generates, based on the sequential analysis of the sequence of layers of the disk image, an auto coding sequence. The auto coding sequence includes a sequence of instructions for creating a new disk image. The system determines, based on the collected sensor data and the sequential analysis of the sequence of layers of the disk image, a sequential list of software needed for the computer server. The system determines, using the sequential list of software needed for the computer server, a plurality of infra requirements for a new software container. The system generates the new software container and the new disk image using the auto coding sequence and the plurality of infra requirements.

Certain embodiments provide one or more technical advantages. For example, certain embodiments improve the efficiency of a computer or software code by automatically generating parameters needed for building a disk image into a container. Typically, disk images within containers are built using parameters that are manually coded or otherwise provided by users. These parameters control, for example, computer memory and disk space dedicated for the container. This may lead to unwanted situations where resources such as memory and disk space are over-reserved for a container, thereby causing inefficient use of computer resources. However, embodiments of the disclosure automatically generate the correct and most efficient parameters needed for building a disk image into a container, thereby optimizing dedicated computer resources such as memory and disk space for the container. This promotes efficient use of available computer resources since resources such as memory and disk space will be more efficiently used.

The embodiments described in this disclosure may be integrated into a practical application of a container image optimizer that solves multiple technical problems of typical container framework systems. The container image optimizer acts as a digital twin of an existing image container by simulating execution of the image container and analyzing how the parameter requirements for the image container (e.g., memory and disk space requirements) change over time. Using this analysis, the container image optimizer is able to automatically determine more accurate and efficient parameters to use for future copies of the image container. This eliminates the guesswork and manual coding of the parameters of typical container framework systems, thereby increasing worker productivity. The image container also increases the functioning of computer systems by automatically providing accurate system resource parameters for image containers, thus eliminating typical problems such as over- or under-reserving computer resources for image containers.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
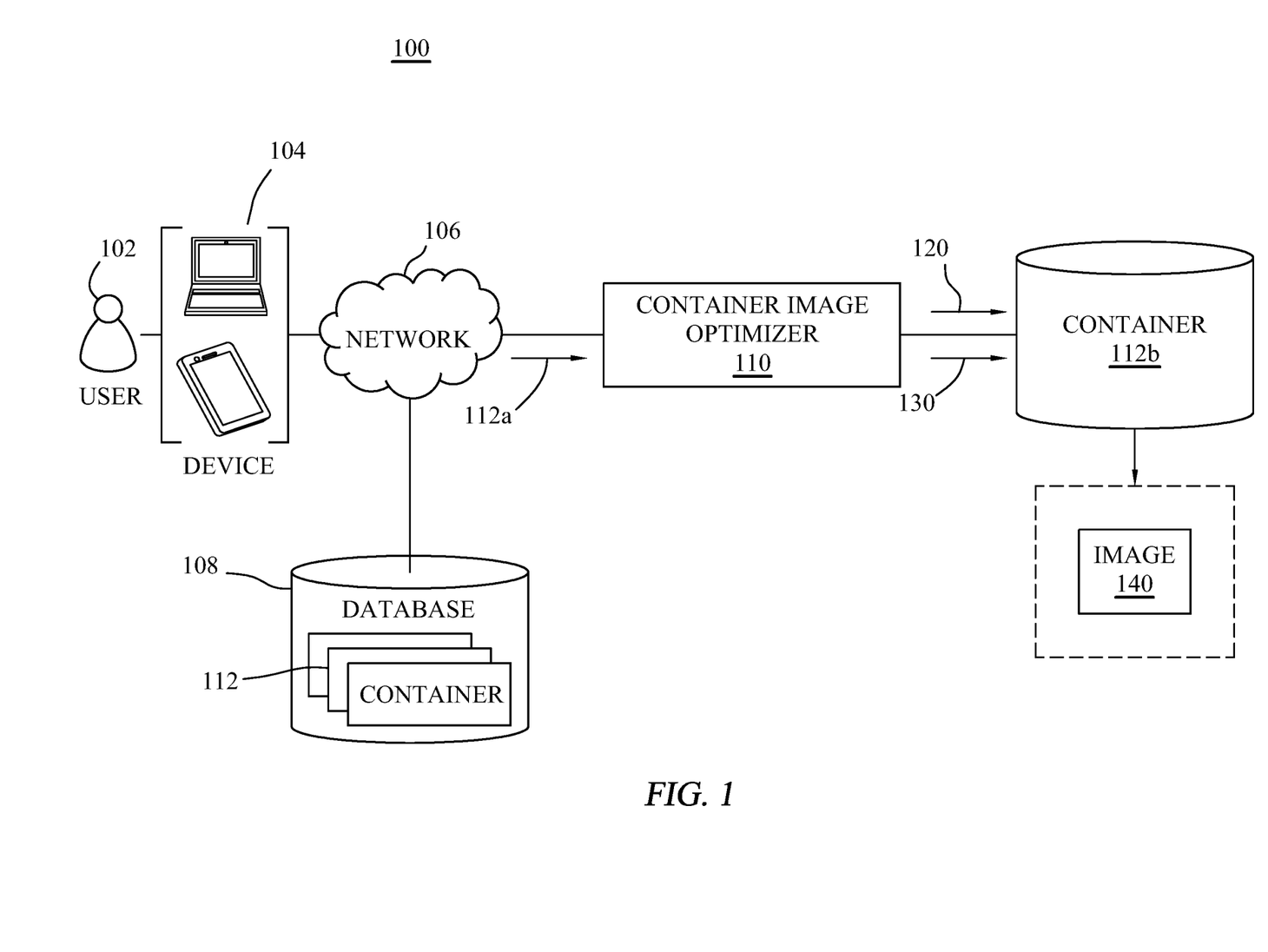
FIG. 1 is a schematic diagram of an example system for container image optimization, according to certain embodiments.
Figure 2:
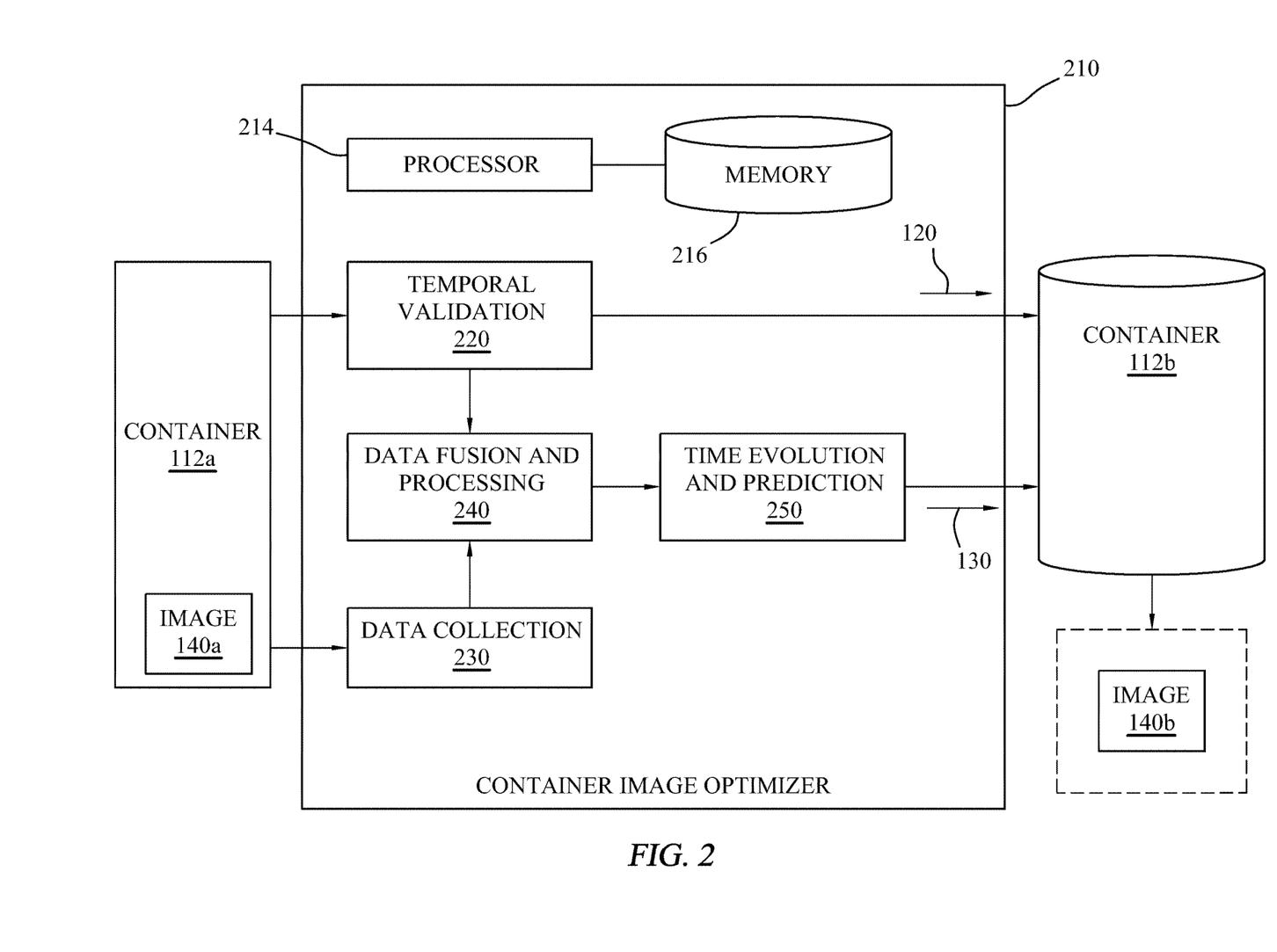
FIG. 2 is a schematic diagram of an example container image optimizer that may be used in the system of FIG. 1, according to certain embodiments.
Figure 3:
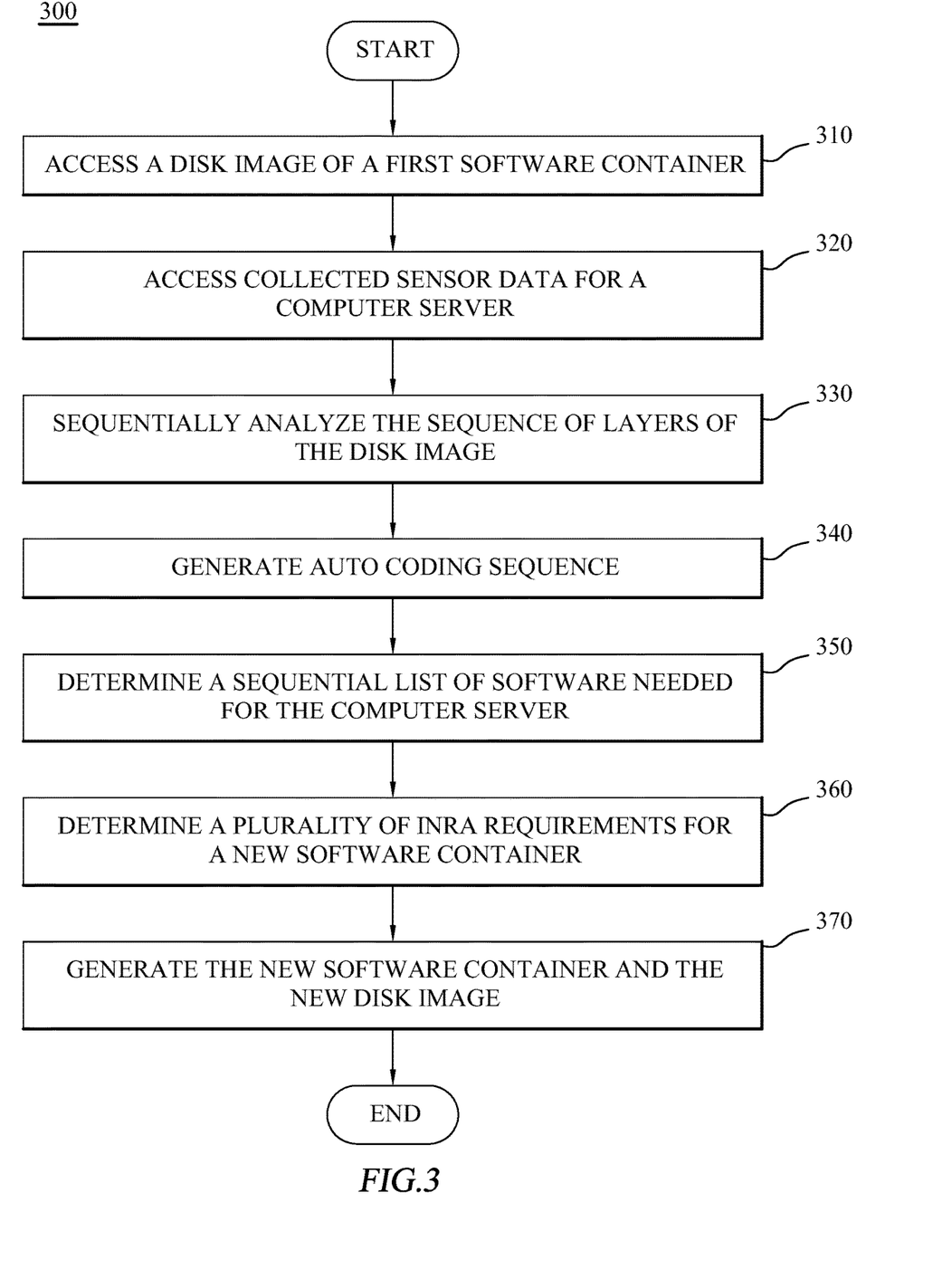
FIG. 3 is a flowchart of a method for container image optimization, according to certain embodiments.

Embodiments of the present disclosure and its advantages are best understood by referring to FIGS. 1 through 3 of the drawings, like numerals being used for like and corresponding parts of the various drawings.

In computer science, a disk image is a replica of the contents of a storage device (e.g., a hard disk drive) stored on a second storage device. In addition, a software container is a standard unit of software that packages up code and dependencies for the code so that an application runs efficiently and reliably from one computing environment to another. Typically, parameters needed for building an image into a container are manually coded by a user. This may lead to inefficiencies and wasted computer resources. For example, a user may allocate more memory for a container than is actually needed by the container, thereby tying up memory for the computer server that cannot be used for other applications. As another example, a user may allocate too little memory for a container, thereby causing a computer server to run out of memory for the container. As yet another example, a user may make errors in identifying dependencies (e.g., libraries, third-party tools, etc.) needed for upload of a disk image, thereby causing errors in the image.

This disclosure contemplates a container image optimizer that automatically generates parameters needed for building a disk image into a container. Generally, the container image optimizer acts as a digital twin of an existing container where a generic data-driven machine-learning model for the time evolution of the system parameters of a container are analyzed. The container image optimizer acts as a simulator of the container which enables auto coding for accurate and efficient image creation. The container image optimizer is enabled by virtualizing a container through systematic consolidation of data, event logs, and other parameters described below.

A practical application of the container image optimizer is that the container image optimizer improves the functioning of a computer or software code by automatically generating parameters (e.g., memory and disk space requirements) needed for building a disk image into a container, in certain embodiments. The container image optimizer acts as a digital twin of an existing image container by simulating execution of the image container and analyzing how the parameter requirements for the image container (e.g., memory and disk space requirements) change over time. For example, the container image optimizer may simulate a container and determine a certain growth rate of memory usage over time (e.g., the memory requirements for the container grows at 2 GB per year). Using this analysis, the container image optimizer is able to automatically determine more accurate and efficient parameters to use for future copies of the image container. This eliminates the guesswork and manual coding of the parameters of typical container framework systems, thereby increasing worker productivity. The image container also increases the functioning of computer systems by automatically providing accurate system resource parameters for image containers, thus eliminating typical problems such as over- or under-reserving computer resources for image containers. The system will be described in more detail using FIGS. 1 through 3.

FIG. 1 illustrates an example system 100. As seen in FIG. 1, system 100 includes one or more devices 104, a network 106, a database 108, and a container image optimizer 110. Generally, system 100 automatically generates parameters needed for building a disk image into a container. In particular embodiments, system 100 improves the functioning of a computer by generating parameters needed for building a disk image into a container in order to efficiently utilize computer resource consumption (e.g., memory and disk space).

User 102 uses devices 104 to interact with other components of system 100. For example, user 102 may be a software developer that uses a device 104 to develop software code. As another example, user 102 may use device 104 to initiate a container image optimization using container image optimizer 110. Device 104 may receive communications from other components of system 100, such as container image optimizer 110. For example, device 104 may receive an optimized container image from container image optimizer 110.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 stores information used by other components of system 100. For example, database 108 may store containers 112 (e.g., container 112a and 112b), which are standard units of software that packages up code and dependencies for the code so that an application runs efficiently and reliably from one computing environment to another. In some embodiments, containers 112 are Python containers. In some embodiments, containers 112 include a disk image 140. Disk image 140 is a computer file that contains the contents and structure of a either a data storage device (e.g., a hard disk drive) or of a disk volume. In some embodiments, disk image 140 contains the necessary information to recreate an entire computing system. This information may include, for example, an operating system, hardware drivers, and applications.

Container image optimizer 110 acts as a digital twin of an existing container 112a by simulating execution of the image container 112a and analyzing how the parameter requirements for the image container 112*a* (e.g., memory and disk space requirements) change over time. Using this analysis, the container image optimizer is able to automatically determine more accurate and efficient parameters (e.g., auto coding sequence 120 and infra requirements 130 described below) to use for future copies of the image container such as container 112*b*. In some embodiments, container image optimizer 110 is enabled by virtualizing container 112*a* through systematic consolidation of data, event logs, and other parameters using various modules (e.g., temporal validation module 220, data collection module 230, data fusion and processing module 240, and time evolution and prediction module 250) described in more detail below.

In operation, container image optimizer 110 accesses a first container 112. For example, container image optimizer 110 may access container 112*a* stored in database 108. In some embodiments, container 112*a* may include disk image 140. Container image optimizer 110 acts as a digital twin of container 112*a* by simulating execution of the image container 112*a* and analyzing how the parameter requirements for the image container 112*a* (e.g., memory and disk space requirements) change over time. For example, container image optimizer 110 may simulate container 112*a* and determine a certain growth rate of memory usage over time (e.g., the memory requirements for the container grows at 2 GB per year). In some embodiments, container image optimizer 110 utilizes various modules such as temporal validation module 220, data collection module 230, data fusion and processing module 240, and time evolution and prediction module 250 (described in more detail below) to simulate container 112*a* and analyze the parameter requirements for image container 112*a*. Using this analysis, container image optimizer 110 generates auto coding sequence 120 and infra requirements 130, which are used to accurately and efficiently create container 112*b* and image 140. By automatically generating parameters (i.e., auto coding sequence 120 and infra requirements 130) needed for building a disk image 140 into a container 112*b*, the functioning of a computer or software code by may be improved since computer resource consumption (e.g., memory and disk space) may be optimized. Specific details about how certain embodiments generate auto coding sequence 120 and infra requirements 130 are discussed in more detail below with respect to FIG. 2.

FIG. 2 is a schematic diagram of an example container image optimizer 210 that may be used as container image optimizer 110 in system 100 of FIG. 1. In some embodiments, container image optimizer 210 may include or otherwise utilize a processor 114 and a memory 116, which may be configured to perform any of the actions and functions of container image optimizer 210 described herein. In some embodiments, container image optimizer 210 may utilize various modules, applications, or code to perform the functions described herein. For example, container image optimizer 210 may include a temporal validation module 220, a data collection module 230, a data fusion and processing module 240, and a time evolution and prediction module 250.

Processor 114 is any electronic circuitry, including, but not limited to microprocessors, application specific integrated circuits (ASIC), application specific instruction set processor (ASIP), and/or state machines, that communicatively couples to memory 116 and controls the operation of container image optimizer 210. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware that operates software to control and process information. Processor 114 executes software stored on memory to perform any of the functions described herein. Processor 114 controls the operation and administration of container image optimizer 210 by processing information received from devices 104, network 106, and memory 116. Processor 114 may be a programmable logic device, a microcontroller, a microprocessor, any suitable processing device, or any suitable combination of the preceding. Processor 114 is not limited to a single processing device and may encompass multiple processing devices.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

In some embodiments, container image optimizer 210 includes temporal validation module 220. In general, temporal validation module 220 generates auto coding sequence 120. Auto coding sequence 120 is a sequence of instructions for creating a new disk image 140*b*. In general, new disk imag 140*b* is an image 140 that is created using parameters (e.g., auto coding sequence 120 and infra requirements 130) that are automatically provided by container image optimizer 110 after container image optimizer 110 simulates container 112*a* in order to analyze the parameter requirements of container 112 over time. In some embodiments, auto coding sequence 120 includes a list of software applications, a version number for each software application, and an order in which to install the plurality of software applications. In some embodiments, temporal validation module 220 generates auto coding sequence 120 by accessing a disk image 140*a* of a first software container 112*a*. Disk image 140*a* includes a sequence of layers. For example, the sequence of layers may include a time-ordered list of operating systems, software applications, hardware drivers, and the like that are listed in order of installation on a computer system. In some embodiments, temporal validation module 220 sequentially analyzes the sequence of layers of disk image 140*a*. For example, temporal validation module 220 may run a test that sequentially validates the sequence of layers of disk image 140*a* to ensure that each item in the sequence of layers may be executed on a computer system without any issues (e.g., no dependency issues, etc.). In some embodiments, temporal validation module 220 may stop the test and highlight any discovered errors in the sequence of layers. Based on the sequential analysis of the sequence of layers of disk image 140*a*, temporal validation module 220 generates auto coding sequence 120, which is a sequence of instructions for creating a new disk image 140b. For example, if any errors are found during the sequential analysis of the sequence of layers of disk image 140a, the error may be corrected in the new sequence of instructions of auto coding sequence 120 (e.g., a dependency issue may be corrected). Temporal validation module 220 may store auto coding sequence 120 in any appropriate storage location and may additionally send auto coding sequence 120 to data fusion and processing module 240, described in more detail below.

In some embodiments, container image optimizer 210 utilizes data collection module 230 along with other modules as illustrated in FIG. 2 to act as a digital twin of container 112a. In general, data collection module 230 accesses and collects various sensor data for container 112a. For example, data collection module 230 may access and collect various event logs, container characteristics, temporal decisions, application heuristics, and the like for container 112a. Some specific examples of data collected by data collection module 230 include the software (type and version) installed by container 112a, an amount of computer memory used by container 112a for specific time periods (e.g., memory usage went from 2 GB to 10 GB after six months), and a rate of load for container 112a. The data collected by data collection module 230 may be sent to data fusion and processing module 240, described in more detail below.

In some embodiments, container image optimizer 210 utilizes data fusion and processing module 240 along with other modules as illustrated in FIG. 2 to act as a digital twin of container 112a. In general, data fusion and processing module 240 merges data provided by temporal validation module 220 (e.g., auto coding sequence 120) and data collection module 230 (e.g., what software is currently installed). The merged data is then used by data fusion and processing module 240 to generate a sequential list of software needed for a computer server. The sequential list may include, for example, versions of software (e.g., applications, operating systems, hardware drivers, etc.) and a sequential order in which to install the software. In some embodiments, data fusion and processing module 240 may additionally determine, based on the collected sensor data from data collection module 230 and the sequential analysis of the sequence of layers of the disk image from temporal validation module 220, a version number for each software application in the sequential list of software needed for the computer server. In some embodiments, the sequential list of software needed for the computer server that is generated by data fusion and processing module 240 is sent to time evolution and prediction module 250, described in more detail below.

In some embodiments, container image optimizer 210 utilizes time evolution and prediction module 250 along with other modules as illustrated in FIG. 2 to act as a digital twin of container 112a. Time evolution and prediction module 250 determines, using the sequential list of software needed for the computer server from data fusion and processing module 240, infra requirements 130 for a new software container 112b. In some embodiments, infra requirements 130 include an amount of computer memory and an amount of disk storage space. In general, time evolution and prediction module 250 generates infra requirements 130 that will ensure container 112b is capable enough to run for a long enough period of time without any issues (e.g., will run for six months without running out of memory). In some embodiments, time evolution and prediction module 250 may determine a growth rate (e.g., a memory growth rate) of container 112a using the input data to time evolution and prediction module 250. For example, time evolution and prediction module 250 may determine that container 112a used 2 GB of memory at the initial execution and then 6 GB of memory six months later. This memory growth rate may then be used to calculate an amount of memory for infra requirements 130. Time evolution and prediction module 250 may store infra requirements 130 in any appropriate storage location.

FIG. 3 illustrates a method 300 for container image optimization, according to certain embodiments. In general, method 300 may be utilized by container image optimizer 110 and container image optimizer 210 to act as a digital twin of an existing image container by simulating execution of the image container and analyzing how the parameter requirements for the image container (e.g., memory and disk space requirements) change over time. Based on this analysis, method 300 may automatically provide more accurate and efficient parameters (e.g., auto coding sequence 120 and infra requirements 130) to use for future copies of the image container. Method 300 may begin at step 310 where a disk image of a first software container is accessed. In some embodiments, the disk image is image 140a and includes a sequence of layers. In some embodiments, the first software container is container 112a. The first software container may be, for example, a Python container. In some embodiments, step 310 is performed by temporal validation module 220.

At step 320, collected sensor data for a computer server is accessed. In some embodiments, step 320 is performed by data collection module 230. In some embodiments, the collected sensor data of step 320 includes various event logs, container characteristics, temporal decisions, application heuristics, and the like for container 112a.

At step 330, the sequence of layers of the disk image accessed in step 310 is sequentially analyzed. In some embodiments, step 330 is performed by temporal validation module 220. In some embodiments, the sequence of layers may include a time-ordered list of operating systems, software applications, hardware drivers, and the like that are listed in order of installation on a computer system. In some embodiments, sequentially analyzing the sequence of layers of the disk image in step 330 includes running a test that sequentially validates the sequence of layers of the disk image to ensure that each item in the sequence of layers may be executed on a computer system without any issues (e.g., no dependency issues, etc.).

At step 340, method 300 generates, based on the sequential analysis of the sequence of layers of the disk image of step 330, an auto coding sequence. In some embodiments, the auto coding sequence is auto coding sequence 120 and includes a sequence of instructions for creating a new disk image such as image 140b. In some embodiments, the auto coding sequence includes a list of a plurality of software applications, a version number for each software application, and an order in which to install the plurality of software applications. In some embodiments, step 340 of method 300 is performed by temporal validation module 220.

At step 350, method 300 determines, based on the collected sensor data of step 320 and the sequential analysis of the sequence of layers of the disk image of step 330, a sequential list of software needed for the computer server. In some embodiments, the sequential list may include, for example, versions of software (e.g., applications, operating systems, hardware drivers, etc.) and a sequential order in which to install the software. In some embodiments, step 350 is performed by data fusion and processing module 240.

At step 360, method 300 determines, using the sequential list of software needed for the computer server of step 350, a plurality of infra requirements for a new software container. In some embodiments, the plurality of infra requirements is infra requirements 130. In some embodiments, the infra requirements include an amount of computer memory and an amount of disk storage space. In some embodiments, step 360 is performed by time evolution and prediction module 250.

At step 370, method 300 generates the new software container and the new disk image using the auto coding sequence and the plurality of infra requirements. In some embodiments, the new software container is container 112b, and the new disk image is image 140b. After step 370, method 300 may end.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a computer processor;
   one or more memory units;
   a first software container stored in the one or more memory units, wherein the first software container comprises a disk image;
   a temporal validation module stored in the one or more memory units, wherein the temporal validation module is configured to:
      access the disk image of the first software container, wherein the disk image of the first software container comprises a sequence of layers;
      sequentially analyze the sequence of layers of the disk image of the first software container; and
      generate, based on the sequential analysis of the sequence of layers of the disk image of the first software container, an auto coding sequence, wherein the auto coding sequence comprises a sequence of instructions for creating a new disk image;
   a data collection module stored in the one or more memory units, wherein the data collection module is configured to access collected sensor data for a computer server;
   a data fusion and processing module stored in the one or more memory units, wherein the data fusion and processing module is configured to determine, based on the collected sensor data for the computer server and the sequential analysis of the sequence of layers of the disk image of the first software container, a sequential list of software needed for the computer server; and
   a time evolution and prediction module stored in the one or more memory units, wherein the time evolution and prediction module is configured to:
      determine, using the sequential list of software needed for the computer server, a plurality of infra requirements for a new software container; and
      generate the new software container and the new disk image using the auto coding sequence and the plurality of infra requirements for the new software container.

2. The system of claim 1, wherein the first software container is a Python container.

3. The system of claim 1, wherein the plurality of infra requirements for the new software container comprises:
   an amount of computer memory; and
   an amount of disk storage space.

4. The system of claim 1, wherein the auto coding sequence comprises:
   a list of a plurality of software applications;
   a version number for each software application of the plurality of software applications; and
   an order in which to install the plurality of software applications.

5. The system of claim 1, wherein the collected sensor data for the computer server comprises:
   a plurality of event logs for the computer server;
   a plurality of container characteristics;
   a plurality of temporal decisions for the computer server; or
   a plurality of application heuristics.

6. The system of claim 1, wherein the data fusion and processing module is further configured to:
   determine, based on the collected sensor data for the computer server and the sequential analysis of the sequence of layers of the disk image of the first software container, a version number for each software application in the sequential list of software needed for the computer server.

7. The system of claim 1, wherein the time evolution and prediction module is further configured to:
   determine a predicted growth rate for an amount of computer memory needed for the first software container;
   wherein the plurality of infra requirements for the new software container are further determined based on the predicted growth rate for the amount of computer memory needed for the first software container.

8. A method executed by a computing device, the method comprising:
   accessing a disk image of a first software container, wherein the disk image of the first software container comprises a sequence of layers;
   accessing collected sensor data for a computer server;
   sequentially analyzing the sequence of layers of the disk image of the first software container;
   generating, based on the sequential analysis of the sequence of layers of the disk image of the first software container, an auto coding sequence, wherein the auto coding sequence comprises a sequence of instructions for creating a new disk image;

determining, based on the collected sensor data for the computer server and the sequential analysis of the sequence of layers of the disk image of the first software container, a sequential list of software needed for the computer server;

determining, using the sequential list of software needed for the computer server, a plurality of infra requirements for a new software container; and generating the new software container and the new disk image using the auto coding sequence and the plurality of infra requirements for the new software container.

9. The method of claim 8, wherein the first software container is a Python container.

10. The method of claim 8, wherein the plurality of infra requirements for the new software container comprises:
an amount of computer memory; and
an amount of disk storage space.

11. The method of claim 8, wherein the auto coding sequence comprises:
a list of a plurality of software applications;
a version number for each software application of the plurality of software applications; and
an order in which to install the plurality of software applications.

12. The method of claim 8, wherein:
a temporal validation module sequentially analyzes the sequence of layers of the disk image of the first software container and generates the auto coding sequence;
a data collection module accesses the collected sensor data for the computer server;
a data fusion and processing module determines the sequential list of software needed for the computer server; and
a time evolution and prediction module determines the plurality of infra requirements for the new software container.

13. The method of claim 8, further comprising:
determining, based on the collected sensor data for the computer server and the sequential analysis of the sequence of layers of the disk image of the first software container, a version number for each software application in the sequential list of software needed for the computer server.

14. The method of claim 8, further comprising:
determining a predicted growth rate for an amount of computer memory needed for the first software container;
wherein the plurality of infra requirements for the new software container are further determined based on the predicted growth rate for the amount of computer memory needed for the first software container.

15. One or more non-transitory computer-readable storage media embodying software, when executed, that is operable to:
access a disk image of a first software container, wherein the disk image of the first software container comprises a sequence of layers;

access collected sensor data for a computer server;
sequentially analyze the sequence of layers of the disk image of the first software container;
generate, based on the sequential analysis of the sequence of layers of the disk image of the first software container, an auto coding sequence, wherein the auto coding sequence comprises a sequence of instructions for creating a new disk image;
determine, based on the collected sensor data for the computer server and the sequential analysis of the sequence of layers of the disk image of the first software container, a sequential list of software needed for the computer server;
determine, using the sequential list of software needed for the computer server, a plurality of infra requirements for a new software container; and
generate the new software container and the new disk image using the auto coding sequence and the plurality of infra requirements for the new software container.

16. The one or more non-transitory computer-readable storage media of claim 15, wherein the first software container is a Python container.

17. The one or more non-transitory computer-readable storage media of claim 15, wherein the plurality of infra requirements for the new software container comprises:
an amount of computer memory; and
an amount of disk storage space.

18. The one or more non-transitory computer-readable storage media of claim 15, wherein the auto coding sequence comprises:
a list of a plurality of software applications;
a version number for each software application of the plurality of software applications; and
an order in which to install the plurality of software applications.

19. The one or more non-transitory computer-readable storage media of claim 15, wherein the software, when executed, that is further operable to:
determine, based on the collected sensor data for the computer server and the sequential analysis of the sequence of layers of the disk image of the first software container, a version number for each software application in the sequential list of software needed for the computer server.

20. The one or more non-transitory computer-readable storage media of claim 15, wherein the software, when executed, that is further operable to:
determine a predicted growth rate for an amount of computer memory needed for the first software container;
wherein the plurality of infra requirements for the new software container are further determined based on the predicted growth rate for the amount of computer memory needed for the first software container.

* * * * *